(12) United States Patent
Chantz

(10) Patent No.: US 11,049,521 B2
(45) Date of Patent: Jun. 29, 2021

(54) CONCURRENT SECURE COMMUNICATION GENERATION

(71) Applicant: International Business Machines Corporation, Armonk, NY (US)

(72) Inventor: Hyman Chantz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 35 days.

(21) Appl. No.: 16/359,353

(22) Filed: Mar. 20, 2019

(65) Prior Publication Data
US 2020/0302968 A1 Sep. 24, 2020

(51) Int. Cl.
| G11B 27/031 | (2006.01) |
| G11B 20/00 | (2006.01) |
| G06F 21/60 | (2013.01) |
| G06F 21/62 | (2013.01) |

(52) U.S. Cl.
CPC ......... *G11B 27/031* (2013.01); *G06F 21/604* (2013.01); *G06F 21/6245* (2013.01); *G11B 20/00666* (2013.01)

(58) Field of Classification Search
None
See application file for complete search history.

(56) References Cited

U.S. PATENT DOCUMENTS

| 6,526,128 B1 | 2/2003 | Kermani |
| 6,567,506 B1 | 5/2003 | Kermani |
| 9,514,750 B1 | 12/2016 | Harris |
| 10,002,639 B1* | 6/2018 | Gaeta ................... G11B 27/031 |
| 2008/0184272 A1* | 7/2008 | Brownewell .......... G07C 5/085 |
| | | 719/318 |
| 2008/0208579 A1 | 8/2008 | Weiss et al. |
| 2008/0221882 A1* | 9/2008 | Bundock ................. G10L 15/26 |
| | | 704/235 |
| 2009/0307779 A1 | 12/2009 | Doren |
| 2011/0218798 A1 | 9/2011 | Gavalda |
| 2013/0266127 A1* | 10/2013 | Schachter ........... H04M 3/5175 |
| | | 379/88.01 |
| 2015/0281446 A1 | 10/2015 | Milstein et al. |
| 2018/0032755 A1* | 2/2018 | Odinak ............... H04L 63/0428 |
| 2018/0084110 A1* | 3/2018 | Fraizer .................. G06Q 20/16 |

OTHER PUBLICATIONS

Anonymous, "Confidential Information privacy using a Cognitive System," An IP.com Prior Art Database Technical Disclosure, IP.com Disclosure No. IPCOM000252890D, Publication Date: Feb. 20, 2018, 4 pages.

* cited by examiner

*Primary Examiner* — Heather R Jones
(74) *Attorney, Agent, or Firm* — Nolan M. Lawrence (57) ABSTRACT

A recording of an audio stream is initiated. The audio stream is a part of a communication between two or more participants. A first indication related to the audio stream is received. The first indication is that the audio stream should start being altered. A second indication related to the audio stream is received. The second indication is that the audio stream should stop being altered. A portion of the recorded audio stream between the first indication and the second indication is altered.

20 Claims, 4 Drawing Sheets

CONCURRENT SECURE COMMUNICATION GENERATION

BACKGROUND

The present disclosure relates to secure communications, and more specifically, to securing audio and visual communications to protect confidential user information during the occurrence of a confidential communication.

Audio communications occurs in customer facing industries, such as getting support related to a product or service. Audio communications may occur in medical industries, such as discussing medical conditions with healthcare providers. Audio communications may occur in financial industries, such as communicating payment information.

SUMMARY

According to embodiments, disclosed is a method, system, and computer program product. A recording of an audio stream is initiated. The audio stream is a part of a communication between two or more participants. A first indication related to the audio stream is received. The first indication is that the audio stream should start being altered. A second indication related to the audio stream is received. The second indication is that the audio stream should stop being altered. A portion of the recorded audio stream between the first indication and the second indication is altered.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure communications; more particular aspects relate to securing audio and visual communications to protect confidential user information during the occurrence of a confidential communication. While the present disclosure is not necessarily limited to such applications, various aspects of the disclosure may be appreciated through a discussion of various examples using this context.

Increasingly there are situations where communications and transactions are done remotely. Business and communication are often performed remotely (e.g., from disparate remote geographic locations) via telephone. More recently, two additional technologies have increased the number of remote transactions: the Internet, and the smartphone. As the Internet has become ubiquitous and as people have come to rely on smartphones, many more transactions have become predominantly conducted remotely.

Whereas previously many scenarios were conducted by traveling to a physical location, increasingly they are done remotely between parties that are located in disparate geographic locations. In a first example, banking and financial operations used to be done by parties physically traveling to a financial institution. Continuing the first example, now financial transactions are performed with a telephone either alone or in combination with a personal computer that accesses an Internet website. In a second example, people would go to a hospital or medical clinic and physically meet with a healthcare provider to diagnose medical conditions. Continuing the second example, a user now uses her smartphone to discuss medical conditions with a healthcare provider.

Though audio and video conversations can be helpful to allow parties to communicate with each other, the ubiquity of the communications has led to a multitude of other issues. As companies try and improve customer service and offer improved experiences in audio conversations, often they have turned to recording those conversations. Generally, the audio conversation starts with a notice to the customer that the conversation is being recorded. While having audio recordings may be beneficial to companies, there are privacy concerns that stem from audio recordings.

Additionally, there are government regulations that restrict the use and storage of confidential personal information. For example, the European Union has recently created the General Data Protection Regulation law directed at ensuring that personal information of individuals is protected.

There are many circumstances in such areas as banking, retail, and healthcare where certain details of the conversation must be kept extremely confidential. For example, when a customer is talking to a retailer to buy shoes, the customer may not mind if the discussion regarding shoe size or color is recorded but would want their credit card number protected.

One potential solution to this problem is natural language processing (NLP) systems. NLP systems could provide some advantages to analyzing and identifying words and phrases related to personal information. There are big drawbacks, however, to the use of NLP systems. One of the more widespread techniques for NLP involves neural networks. Neural networks rely on large data sets to train a computer system to correctly identify a piece of information, such as private data. These large data sets are often costly to obtain, or in some cases completely unable to be obtained, because the data needed for training a to be identified is private data.

Additionally, the amount of processing power required to provide NLP systems for widespread uses is also technologically impractical. In a first example, a neural network or other language identification process of an NLP system requires expensive computer systems, sometimes with specialized processing units, and many gigabytes of memory.

Additionally, though NLP systems may perform well enough after training, the variety of languages, accents, subject matter, and conversation variety may make such a solution impractical. Further, NLP systems often require a large amount of time (e.g., weeks or months) to implement, train, and validate. The highly specific uses cases, and lengthy amount of implementation time for quality NLP systems can be impractical given legal, regulator, and customer requirements for privacy in audio and visual communications.

Embodiments of the present disclosure may overcome the stated issues and may provide for creating recordings (alternatively, audio recordings, video recordings, AV recordings, etc.). Embodiments may further address the demand for a technical solution to providing confidentiality and privacy. Rapid confidentiality techniques (RCT) may provide participants in conversations with privacy in a cost effective and accurate manner. RCT may operate without expensive or specialized equipment. RCT may operate in audio conversations between two or more participants. RCT may operate in video communications between participants. RCT may operate in singular conversations with one participant, such as audio journals or video blogs.

Rapid confidentiality techniques may provide for generating a recording that includes the general conversation of one or more participants and altering portions of the conversation, such as portions deemed confidential or private by a participant. Altering a portion of a recording may include masking, blurring, trimming, obscuring, scrambling, eliminating, clipping, subtracting, removing or erasing some of the audio and/or video from a recording. Altering a portion of a recording may include any relevant technique to alter a subset of a recording such that the altered subset is permanently indecipherable or unintelligible. Altering a portion of a recording may include inserting or overwriting a portion with a new element, such as a tone, continuous sound, media file, random values, or picture. Altering may include removing a portion, such that the generated recording is less time than that of the original communication or conversation. Altering may include maintaining the original time of the recording, such that the duration of the altered recording is the same an unaltered recording of the same conversation.

The alteration may be based on receiving indications that a portion should be altered. Receiving a first indication may be an indication to begin altering, and receiving a second indication may be an indication to stop altering. The indications may be received at a specific times or timestamps (e.g., receiving a first indication at two minutes and three seconds, receiving a second indication at three minutes and twelve seconds). In some embodiments, the indications may be received and stored either with the generated recording or separately. RCT may include generating a second recording that does not alter portions of the conversation. This second recording may be stored in a more secure location to protect confidential information. RCT may operate with existing phone networks, IP based communication networks, video chats, or other existing real-time communications.

Figure 1:
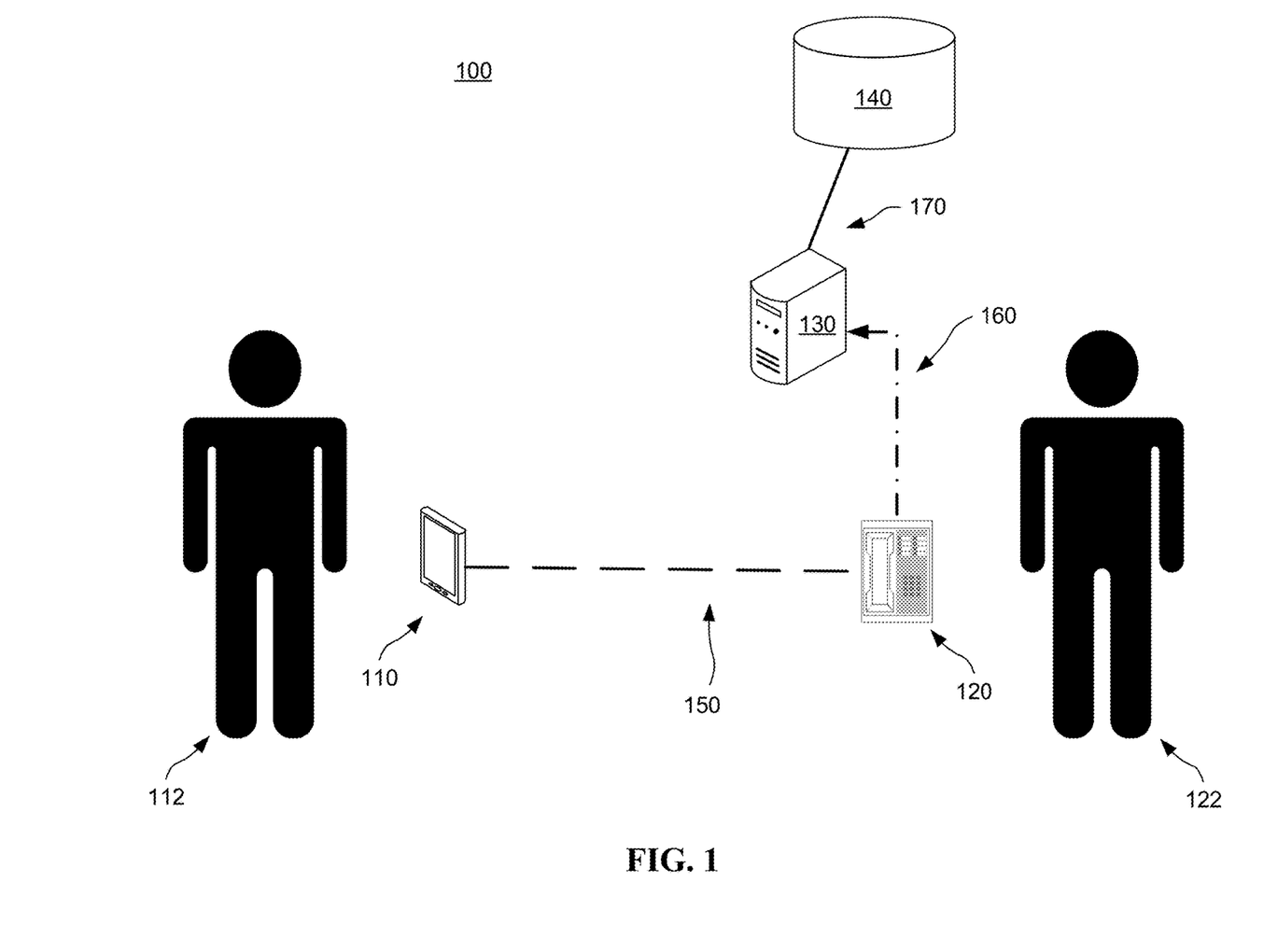
FIG. 1 depicts an example system for implementing recordings with confidentiality techniques consistent with embodiments of the disclosure.
Figure 4:
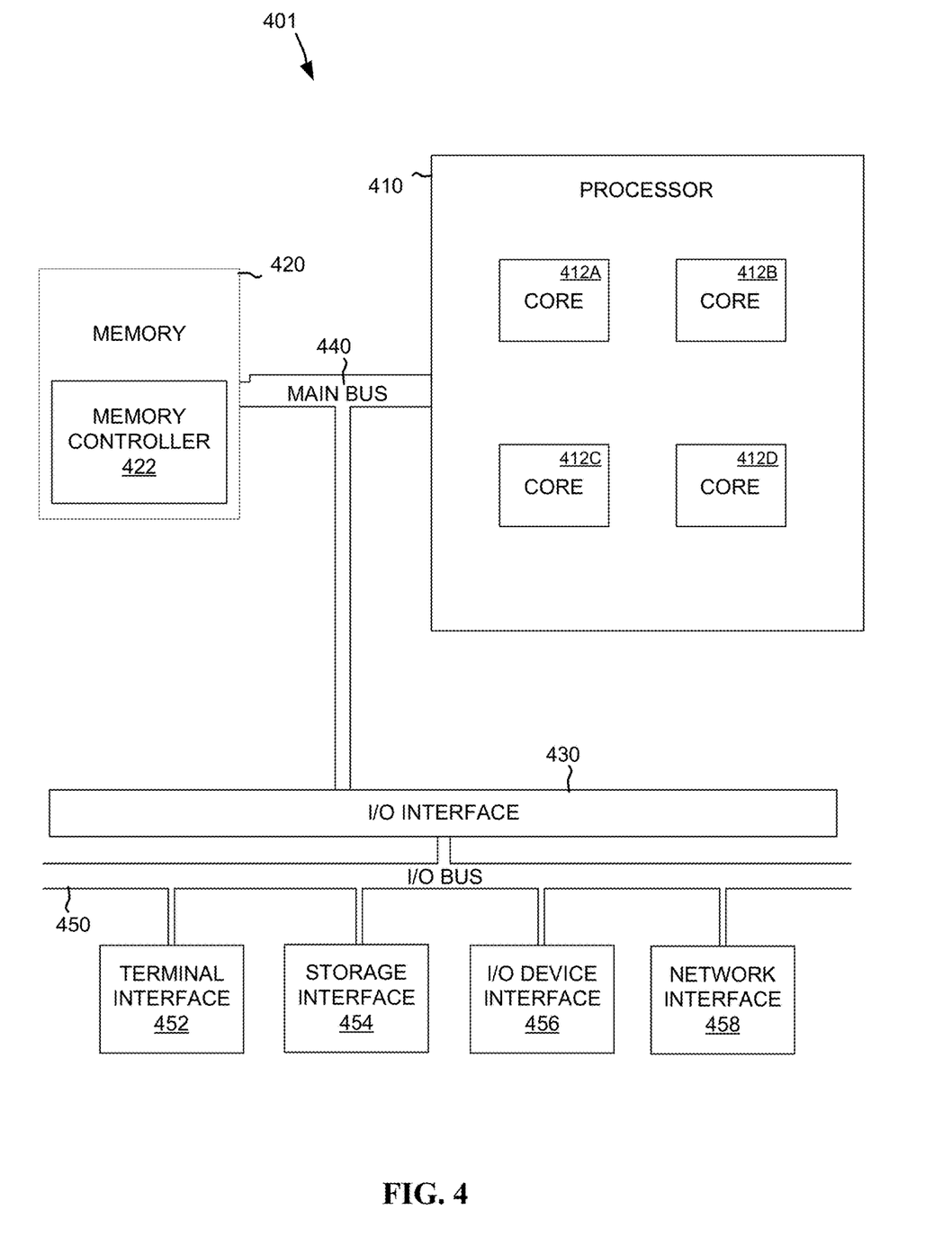
FIG. 4 depicts the representative major components of an example computer system that may be used, in accordance with embodiments of the present disclosure.

FIG. 1 depicts an example system 100 for implementing recordings with confidentiality techniques consistent with embodiments of the disclosure. System 100 includes a first communications device (first device) 110, a second communications device (second device) 120, a server 130, and a data store 140. First device 110 is a smartphone configured to make and receive telephone calls over a telephone network, such as a GSM, CDMA, LTE, etc. Second device 120 is a telephone communicatively coupled to the same telephone network as first device 110. Server 130 is computer system hardware, and related software, configured to send and receive data, with other devices over a network (not depicted). An example computer system consistent with server 130 is depicted in FIG. 4. Data store 140 is a repository for receiving, storing, and otherwise providing data. Data store 140 may include processing circuits and primary memory (not depicted) for performing operations. Data store 140 may be a tape storage system, network attached storage, or other dedicated storage device communicatively coupled to one or more of the other components of system 100.

First device 110 is operated by a first participant 112 and second device 120 is operated by a second participant 122. The first device 110 and the second device 120 are communicatively coupled, and facilitate a communication or audio stream (depicted in FIG. 1 by a dashed line) 150 between the first participant 112 and the second participant 122. During the conversation, the audio stream 150 carries the speech of participant 112 to participant 122, as well as the speech of participant 122 to participant 112. For example, participant 122 may be a customer service representative for a company and participant 112 may be a customer of the company. Continuing the example, participant 112 may be trying to renew web-hosting services with the company by discussing the different service plans provided by the company with participant 122.

During the conversation, the audio stream 150 is copied and/or transmitted to server 130 by a network (depicted in FIG. 1 by a dashed and dotted line) 160. Server 130 may be located at the same geographic location (e.g., same building) as participant 122. In some embodiments, server 130 is located at a separate location from participant 122 (e.g., in a server farm). The audio stream may be stored in a primary memory (e.g., RAM) of server 130 temporarily. Server 130 also receives one or more indications that certain portions of the conversation are regarded as private or otherwise confidential. Server 130 may receive the indications through network 160 or through another network (not depicted).

In some embodiments, server 130 receives the indications from participant 122. The indications received by server 130 may be in the form of electronic signals separate from the audio stream. For example, participant 122 presses a button on a computer (not depicted) located near participant 122. The indications received by server 130 may be in the form of device created signals. For example, second device 120 may be a touch-tone telephone capable of receiving input from a user and creating specific tones, and responsive to receiving user input, inserting those specific tones into an audio stream. The indications received by server 130 may be in the form of a specific phrase or key phrase. For example, the phrase may be the specific series words "we are now discussing payment details" in successive order.

Upon receipt of a first indication, server 130 begins removing part of the audio recording. After receipt of a second indication, server 130 stops removing part of the audio recording. The first indication and the second indication may be the same indication, such as receiving a specific tone from second device 120 at a first time and a second time, respectively. The first indication and the second indication may be different but of the same type. For example, the first indication may be a first tone created in response to participant 122 pressing the '9' key on second device 120. Continuing the example, the second indication may be a second tone, having a different pitch from the first tone, created in response to participant 122 pressing the '1' key on second device 120. The first indication and the second indication may be of different types. For example, the first indication may be a specific phrase "we are now going to discuss your medical details" stated by participant 122. Continuing the example, the second indication may be a first tone created in response to participant 122 pressing the '0' key on second device 120.

After the conversation has ended, one or more of the participants 112 and 122 end the conversation, and the audio stream 150 ends. Upon the end of the audio stream 150, the server responsively finishes creating the audio recording. Using a connection 170, the server 130 stores the audio recording with the removed portion in the data store 140.

Figure 2:
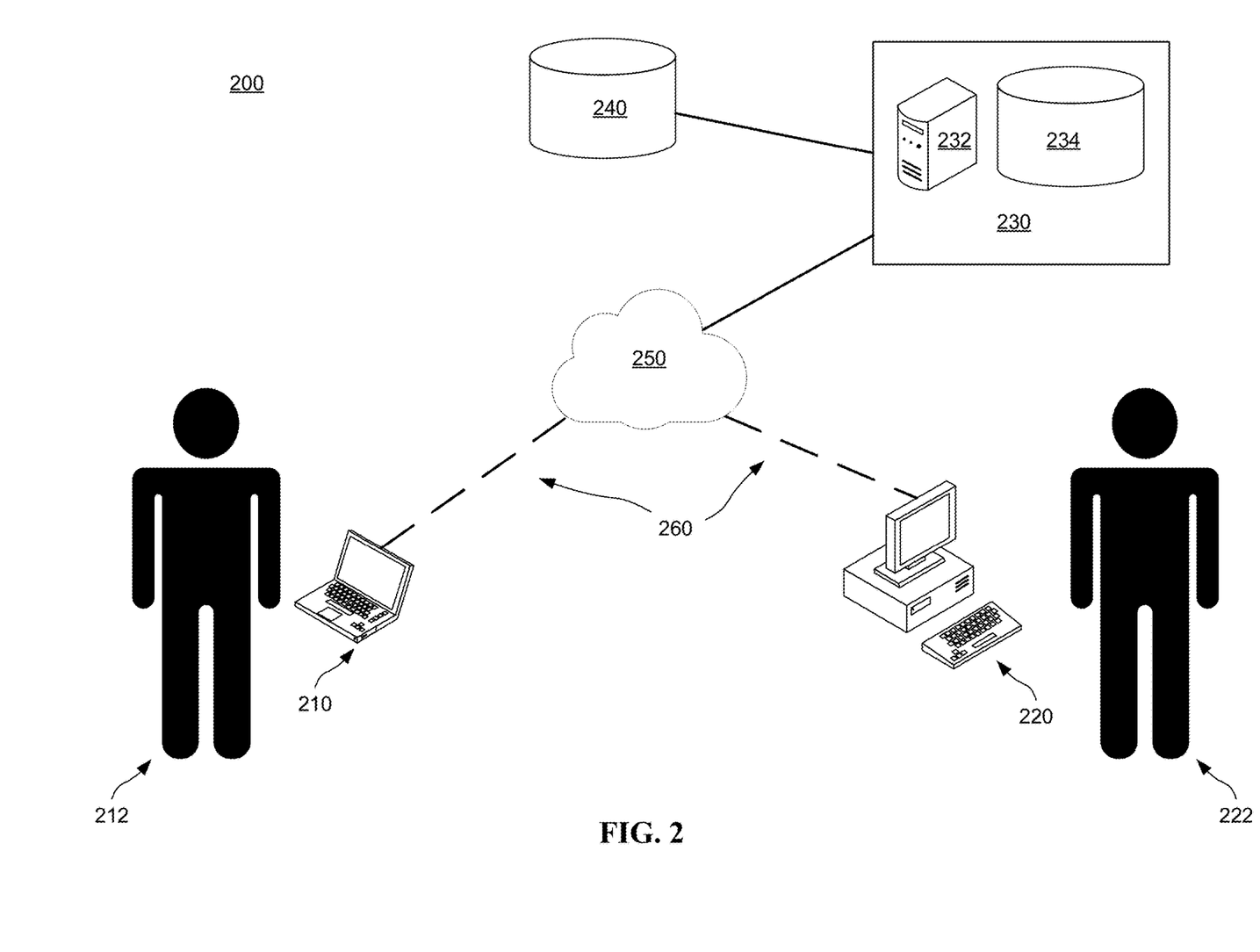
FIG. 2 depicts an example system for implementing recordings with confidentiality techniques consistent with embodiments of the disclosure.

FIG. 2 depicts an example system 200 for implementing recordings with confidentiality techniques consistent with embodiments of the disclosure. Recordings may be audio, such as a conversation between participants. Recordings may be video, such as between participants communicating with sign language. Recordings may include a combination of audio and video. System 200 includes the following: a first communication device 210 (first device); a second communication device 220 (second device); a datacenter 230 for creating and storing altered recordings; a secure data store 240 for storing recordings; and a network 250 communicatively coupling various components together.

First communication device 210 is a portable computer capable of transmitting and receiving audio and video. First device 210 may include integrally a microphone and a camera for receiving audio and video, respectively, from a user. First device 210 may include integrally a speaker and a display for transmitting audio and video, respectively, to a user. Second communication device 220 is a desktop computer including a display capable of transmitting and video to a user. Second device 220 may also include speakers (not depicted) for transmitting audio to a user. A camera and microphone (not depicted) may be communicatively coupled to second device 220 for transmission of video and audio, of a user.

Datacenter 230 is a server room at a separate geographic location from the first device 210 and the second device 220. Datacenter 230 may be operated by a separate third party from any participant and may be responsible for creating and storing various recordings. Datacenter 230 includes at least one server 232 for processing recordings of participant communications and an altered data store 234 for storing altered recordings. In some embodiments, multiple servers (not depicted) are configured for processing and storing recordings. Server 232 is a computer device configured to receive and alter recordings. FIG. 4 depicts an example computer system capable of providing server functionality consistent with embodiments. Server 232 receives communication streams through network 250 and creates altered recordings responsive to receiving indications from participants. Server 232 stores the created altered recordings in altered data store 234. Altered data store 234 may be a database, data warehouse, network attached storage, or other relevant long-term storage system for storing and retrieving altered recordings. Data store 234 may use one or more relevant techniques to store altered recordings, such as utilizing a compression or archival format that reduces storage space.

Server 232 also transmits unaltered recordings to secure data store 240. Secure data store 240 may be a database, data warehouse, network attached storage, or other relevant long-term storage system for storing unaltered recordings. Secured data store 240 may implement one or more secure techniques to ensure that unaltered recordings are not easily obtained. For example, secure data store 240 can be located at a separate geographic location from other components of system 200. In another example, secure data store 240 can be communicatively coupled only to datacenter 230 and not connected to any other network, including network 250. In yet another example, secure data store 240 can implement encryption to store unaltered recordings.

First device 210 is operated by a first participant 212 and second device 220 is operated by a second participant 222. The first device 210 and the second device 120 are communicatively coupled and facilitate a communication stream (depicted in FIG. 2 by a dashed line) 260 between the first participant 212 and the second participant 222. During the conversation, the communication stream 260 carries the audio and video of participant 112 to participant 122, as well as the audio and video of participant 122 to participant 112. For example, participant 122 may be a healthcare provider for a medical institution and participant 112 may be a patient of the healthcare provider. Continuing the example, participant 112 may be trying to discuss a medical condition with and seek medical advice from participant 122.

Server 232 received, through the network 250, the communication stream as well as indications. In detail, participant 212 or participant 222 can transmit, to server 232, an indication that a portion of communication stream 260 should be blocked. The participants 212 and 222 can transmit the indications by pressing a button on first device 210 or second device 220, respectively. In some embodiments, participants 212 and 222 transmit an indication by pressing a button on an auxiliary device (not depicted), such as a remote control or a smartphone. Based on the indications, server 232 alters the recording. In a first example, while a participant holds down a button, server 232 removes portions of the audio and/or video of the conversation.

In a second example, when a participant presses a button a first time, server 232 notes the timestamp of the communication stream. When a participant presses a button a second time, server 232 notes a second timestamp of the communication stream. This process repeats every time an indication is received, such as from button presses or based on specific key phrases. Key phrases may include "I am now going to discuss your personal information" or "we have stopped discussing your personal information." After the communication stream 260 between participants 212 and 222 is finalized, server 232 keeps a first copy in a memory (not depicted) of server 232 and creates a second copy—also in the memory. The server 232 reviews the communication stream in memory of the server and maps the timestamps to the first copy of the communication stream. The server 232 alters the first copy between the first timestamp and the second time stamp by removing portions of the audio and/or video. The removal of portions of the audio and/or video may save space in the altered data store 234. Server 232 may alter the first copy by overwriting the portion of the audio and/or video with a random pattern of data that is highly compressible. The highly compressible random data patterns may enable altered data store 234 to more efficiently save space while storing the altered first copy. Then server 232 stores the altered first copy in altered data store 234. Finalizing the second example, the server 232 sends the unaltered second copy to the secure data store 240.

Figure 3:
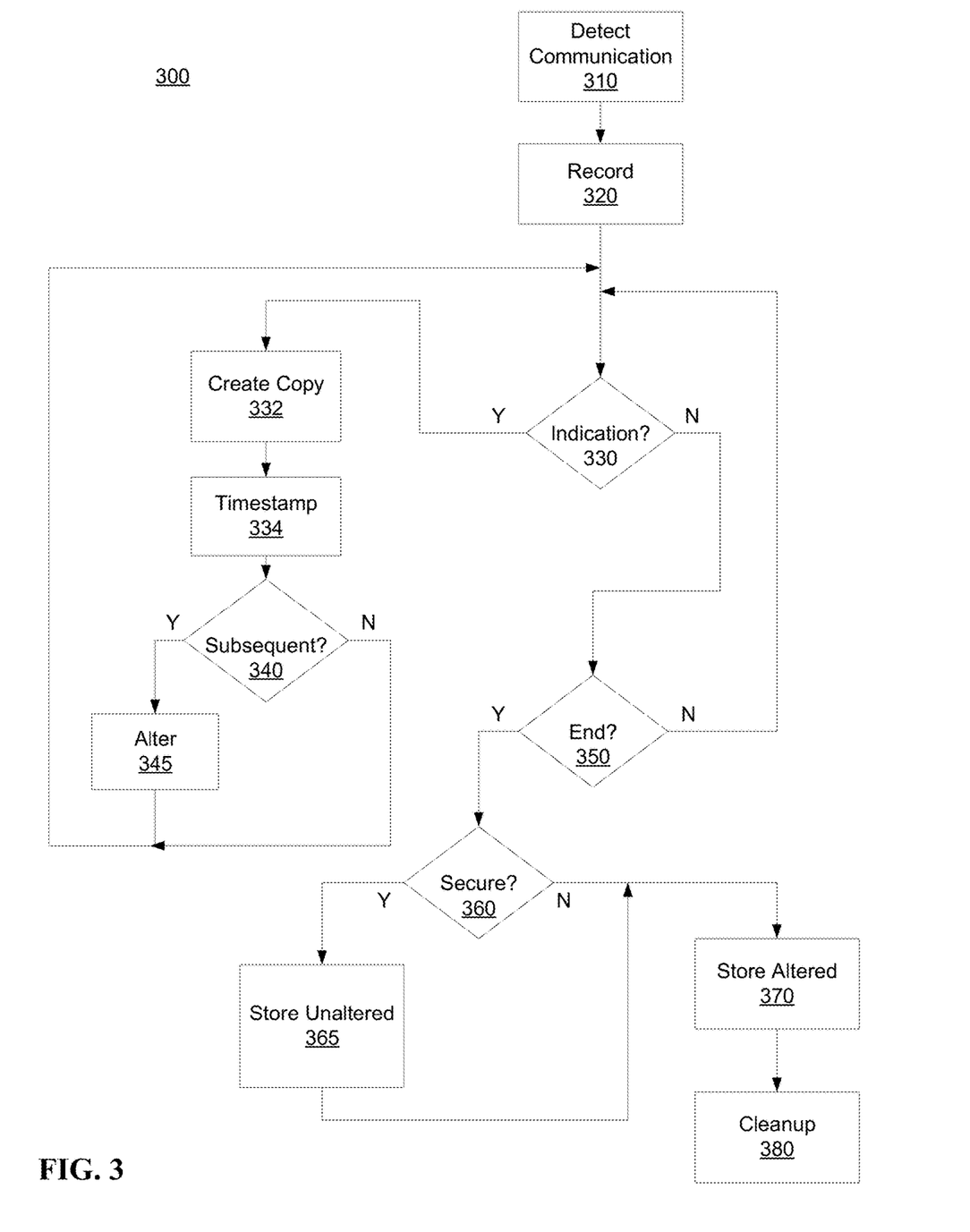
FIG. 3 depicts a method of implementing recordings with confidentiality techniques consistent with embodiments of the disclosure.

FIG. 3 depicts a method 300 of implementing recordings with confidentiality techniques consistent with embodiments of the disclosure. One or more steps of method 300 may be performed by a computer, or computing system. For example, a server, a smartphone, a desktop computer, a tablet, and the like. FIG. 4 depicts a computer system consistent with embodiments, configured to perform one or more steps of method 300.

Method 300 begins by detecting communication by one or more parties on a communication medium at 310. The communication medium may be a telephone line, and detecting of the communication, at 310, may be detecting a tone created by a telephone that is part of facilitating the communication. The communication medium may be an Internet based communication, such as a Voice over Internet Protocol phone connection. The Voice over Internet Protocol may be one of many protocols of communication operating over a network connection. Detecting of communication, at 310, may be from another protocol of the network connection (e.g., detecting a session initiation protocol from a messaging service).

After detecting communication, at 310, creating a recording of the communications begins at 320. The recording, at 320, may be recorded to a primary storage medium. The recording at, 320, may be recorded to a volatile memory (e.g., random-access memory). In some embodiments, the recording, created at 320, is a first recording. The first recording of a communication may be an original or unaltered version of an audio and/or video communication of one or more parties (e.g., a video chat, an audio journal).

During recording of the communications, at 320, it is determined if there is an indication received at 330. If an indication is not received at 330, then it is determined if communication has ended at 350. If the communication has not ended, at 350, then the determination of receiving indications, at 330, continues.

If an indication is received, at 330, then a copy of the recording is created at 332. Creating a copy at 332, may include creating multiple recordings of the detected communication. For example, creating a second recording in addition to the first unaltered recording, first recorded at 320. At 334 a timestamp of the second recording is generated in response to the indication. The timestamp, at 334, is generated responsive to a given participant's indication. For example, a participant may press a button on a telephone and the telephone creates a tone. Continuing the example, the tone is created at one minute twenty-three seconds into the communication. Finalizing the example, the timestamp is generated with a time value of one minute twenty-three seconds. The timestamp, generated at 334, may be inserted directly into the second recording.

If the timestamp is a subsequent timestamp, at 340, then the second recording may be altered at 345. If the timestamp is not a subsequent timestamp, at 340, then the determination of receiving indications, at 330, continues. A subsequent timestamp may be any timestamp that happens after a prior timestamp. A subsequent timestamp may be a timestamp that happens after a matching prior timestamp. For example, a second timestamp happens after a matching first timestamp, and an eighth timestamp happens after a matching seventh timestamp, respectively. Altering, at 345, of the second recording includes modifying the second recording such that the audio and/or video information between two corresponding timestamps is unintelligible or undecipherable. Altering, at 345, may include masking the information. Masking may mean inserting null values, or random values, or a constant audible tone (e.g., a "G #") or video signal (e.g., a picture). Altering, at 345, may include removing trimming or deleting information within the timestamp. For example, a second recording is three minutes long and has two timestamps at one minute ten seconds and one minute fifty-five seconds. Continuing the example, the altered recording would be two minutes and fifteen seconds, with the audio and/or video between one minute ten seconds and one minute fifty seconds removed.

Altering, at 345, may include modifying the content of the recording between the first timestamp and the second timestamp such that the content is unreadable, unintelligible, or otherwise unable to be heard or seen. Altering, at 345, may include modifying the content while maintaining the original time or duration of the recording if the recording was not modified. For example, a first recording of an audio conversation is five minutes and fourteen seconds before the altering, at 345. Continuing the example, the altered second recording is also five minutes and fourteen seconds, however it includes a portion that upon listening the portion is unable to be understood due to the altering, performed at 345.

If the audio recording ceases, at 350, then it is determined if there is a secure storage available at 360. If there is a secure storage available at 360, then the first recording is stored at 365. The availability of secure storage may be based on whether there is sufficient computing resources (e.g., processor, memory) to encrypt the first, unaltered, recording. After storing in secure storage, at 360, or if there is no secure storage at 360, the altered second copy of the communication is stored at 370. After storing the altered second copy ate 370, method 300 performs any clean up operations at 380 and ends. Cleanup at 380 may flushing the unaltered first recording from the primary storage. For example, writing zeros or random data to the location in random-access memory where the first recording is located.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, a memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for protecting confidential information in an audio file, the method comprising:
   initiating recording of an audio stream, the audio stream a part of a communication between two or more participants;
   receiving, before the audio stream is converted, a first indication that the audio stream should start being altered;
   generating, in response to the first indication, a first copy of the audio stream;
   receiving a second indication that the audio stream should stop being altered;
   altering, based on the second indication, a portion of the first copy of the recorded audio stream between the first indication and the second indication; and
   storing, after the communication has ended, an original copy of the record audio stream and the altered first copy of the recorded audio stream, wherein the original copy of the recorded audio stream is unaltered.

2. The method of claim 1, wherein the audio stream is a phone conversation and the first and second indications are provided by touch-tone input from a participant in the phone conversation.

3. The method of claim 1, wherein the first indication is identifying a first phrase in the audio stream and the second indication is identifying a second phrase in the audio stream.

4. The method of claim 1, wherein the audio stream is a first duration before being altered and wherein the audio stream is a second duration after being altered, and wherein the first duration and the second duration are the same.

5. The method of claim 1, wherein the audio stream is part of a video stream, further comprising:
   altering a portion of the video stream in a first storage between the first indication and the second indication.

6. The method of claim 1, further comprising:
   receiving a third indication that the audio stream should start being altered;
   receiving a fourth indication that the audio stream should stop being altered; and
   altering a second portion of the recorded audio stream between the third indication and the fourth indication.

7. The method of claim 1, further comprising:
   detecting, before the initiating recording of an audio stream, the communication that includes the audio stream.

8. The method of claim 7, wherein the altering occurs before an end of the communication, and wherein the method further comprises:
   detecting the end of the communication;
   ceasing, in response to the detecting the end of the communication, recording of the audio stream; and
   storing the recorded audio stream that includes the altered portion in a first storage.

9. The method of claim 1, further comprising:
   storing the recorded audio stream with the altered portion in a first storage.

10. The method of claim 9, further comprising:
    storing the recorded audio stream, without the altering, in a second storage that is more secure than the first storage.

11. A system for protecting confidential information in an audio file, the system comprising:
    a memory; and
    a processor, the processor communicatively coupled to the memory, the processor configured to:
      initiate recording of an audio stream, the audio stream a part of a communication between two or more participants;
      receive a first indication that the audio stream should start being altered;
      generate, in response to the first indication, a first copy of the audio stream;
      receive a second indication that the audio stream should stop being altered;
      alter, based on the second indication, a portion of the first copy of the recorded audio stream between the first indication and the second indication; and
      store, after the communication has ended, an original copy of the record audio stream and the altered first copy of the recorded audio stream, wherein the original copy of the recorded audio stream is unaltered.

12. The system of claim 11, wherein the audio stream is a phone conversation and the first and second indications are provided by touch-tone input from a participant in the phone conversation.

13. The system of claim 11, wherein the first indication is identifying a first phrase in the audio stream and the second indication is identifying a second phrase in the audio stream.

14. The system of claim 11, wherein the audio stream is part of a video stream.

15. The system of claim 14, wherein the processor is further configured to:
    alter a portion of the video stream in a first storage between the first indication and the second indication.

16. A computer program product for protecting confidential information in an audio file, the computer program product comprising a non-transitory computer readable storage medium having program instructions embodied therewith, the program instructions configure to:
- initiate recording of an audio stream, the audio stream a part of a communication between two or more participants;
- receive a first indication that the audio stream should start being altered;
- generate, in response to the first indication, a first copy of the audio stream;
- receive a second indication that the audio stream should stop being altered;
- alter, based on the second indication, a portion of the first copy of the recorded audio stream between the first indication and the second indication; and
- store, after the communication has ended, an original copy of the record audio stream and the altered first copy of the recorded audio stream, wherein the original copy of the recorded audio stream is unaltered.

17. The computer program product of claim 16, wherein the program instructions are further configured to:
- receive a third indication that the audio stream should start being altered;
- receive a fourth indication that the audio stream should stop being altered; and
- alter a second portion of the recorded audio stream between the third indication and the fourth indication.

18. The computer program product of claim 16, wherein the program instructions are further configured to:
- detect, before the initiating recording of an audio stream, the communication that includes the audio stream.

19. The computer program product of claim 16, wherein the program instructions are further configured to:
- store the recorded audio stream with the altered portion in a first storage.

20. The method of claim 19, wherein the program instructions are further configured to:
- storing the full audio stream, without the altering, in a second storage that is more secure than the first storage.

* * * * *